United States Patent
Minier

(10) Patent No.: US 8,064,924 B2
(45) Date of Patent: Nov. 22, 2011

(54) UTILIZING LOCATION-BASED DATA TO MANIPULATE POWER STATES OF EMBEDDED DEVICES

(75) Inventor: Brian V. Minier, Marion, IA (US)

(73) Assignee: Intermec IP Corp., Everett, WA (US)

( * ) Notice: Subject to any disclaimer, the term of this patent is extended or adjusted under 35 U.S.C. 154(b) by 609 days.

(21) Appl. No.: 12/112,449

(22) Filed: Apr. 30, 2008

(65) Prior Publication Data

US 2009/0131074 A1 May 21, 2009

Related U.S. Application Data

(60) Provisional application No. 60/989,275, filed on Nov. 20, 2007.

(51) Int. Cl.
*H04W 24/00* (2009.01)
(52) U.S. Cl. ............. 455/456.1; 713/300; 713/322; 709/224
(58) Field of Classification Search ............ 700/79; 716/105, 133; 429/210; 428/472; 455/456
See application file for complete search history.

(56) References Cited

U.S. PATENT DOCUMENTS

| | | | |
|---|---|---|---|
| 6,377,117 B2 * | 4/2002 | Oskowsky et al. | 330/51 |
| 6,549,625 B1 * | 4/2003 | Rautila et al. | 380/258 |
| 6,647,244 B1 * | 11/2003 | Haymond et al. | 455/11.1 |
| 7,142,872 B2 * | 11/2006 | Park et al. | 455/456.1 |
| 7,184,905 B2 * | 2/2007 | Stefan | 702/63 |
| 7,260,079 B1 * | 8/2007 | Chapman et al. | 370/338 |
| 7,558,566 B2 * | 7/2009 | Koskinen et al. | 455/424 |
| 7,711,814 B1 * | 5/2010 | Emerick et al. | 709/224 |
| 7,756,544 B1 * | 7/2010 | Graham | 455/522 |
| 2005/0027437 A1 * | 2/2005 | Takenaga et al. | 701/117 |
| 2005/0032525 A1 * | 2/2005 | Gasbarro | 455/456.1 |
| 2005/0275527 A1 * | 12/2005 | Kates | 340/539.22 |
| 2006/0009234 A1 * | 1/2006 | Freer | 455/456.1 |
| 2006/0030338 A1 * | 2/2006 | Harken et al. | 455/456.6 |
| 2007/0245163 A1 * | 10/2007 | Lu et al. | 713/300 |
| 2009/0125737 A1 * | 5/2009 | Brey et al. | 713/322 |

* cited by examiner

*Primary Examiner* — Nick Corsaro
*Assistant Examiner* — Mahendra Patel
(74) *Attorney, Agent, or Firm* — Shook, Hardy & Bacon LLP

(57) ABSTRACT

One or more media is provided for performing a method of utilizing location-based data to manipulate power states of one or more embedded devices on a mobile device. Initially, location-based data from a positioning system (GPS satellite) is received. Generally, the location-based data relates to a global position of the mobile device. The location-based data may then be applied to a set of positional rules, which includes comparing the position-based data against the one or more predefined positional coordinates. Accordingly, the appropriate power level of one or more embedded devices may be determined. Further, if the determination indicates that a present power level of the embedded devices conflicts with the determined appropriate power state, the power state of the conflicting embedded devices is manipulated consistent with the positional rule. As such, this configuration provides for a useful power-management scheme that preserves battery life.

17 Claims, 4 Drawing Sheets

UTILIZING LOCATION-BASED DATA TO MANIPULATE POWER STATES OF EMBEDDED DEVICES

CROSS-REFERENCE TO RELATED APPLICATIONS

This application claims the benefit of U.S. Provisional Application No. 60/989,275, filed Nov. 20, 2007 entitled UTILIZING LOCATION-BASED DATA TO MANIPULATE POWER STATES OF EMBEDDED DEVICES.

STATEMENT REGARDING FEDERALLY SPONSORED RESEARCH OR DEVELOPMENT

Not applicable.

BACKGROUND OF THE INVENTION

This invention relates to a mobile device that executes one or more functions utilizing embedded devices. More particularly, an improved mobile device that manages embedded devices by manipulating their respective power states according to location-based data is disclosed.

Many mobile devices are configured to perform a variety of functions. These functions are executed on a variety of embedded devices provided on the mobile device. Often, a number of embedded devices are placed on a particular mobile device to perform a multitude of tasks, as required by a user's occupation, to provide a user a range of functionality on a single device, or for any other reason. These embedded devices are typically active the entire time the mobile device is powered on and thereby reduce the runtime on battery power. However, during a majority of the time that the mobile device is powered on, many of the functions carried out by these embedded devices remain unused. As such, much of the power provided by the battery is depleted by powering idle devices. Generally, the present invention resolves this situation by determining those situations where the power state of certain embedded devices may be reduced and manipulating the power state of those embedded devices accordingly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the invention provide computer-readable media for, among other things, performing a method for utilizing location-based data to manipulate power states of one or more embedded devices. More particularly, a first aspect of an embodiment is directed toward receiving location-based data from a positioning system, where the location-based data relates to a geographic position of a mobile device. A set of positional rules is applied to the location-based data, thereby determining an appropriate power level of the one or more embedded devices within the mobile device. Based on the determined appropriate power level, manipulating the power states of the one or more embedded devices is provided for. These power states that are consistent with the manipulation are stored, at least temporarily. In one embodiment, upon determining an appropriate power level, an output is generated that triggers the manipulation of the power states of the one or more embedded devices.

In a second aspect, embodiments are directed toward a mobile device. Initially, the mobile device is configured for receiving location-based data from a wireless source, where the location-based data relates to a global position of the mobile device. A positional rule is applied to the location-based data. A determination whether the positional rule is satisfied by the location-based data is performed. If the determination indicates that the positional rule was satisfied, the power state of the embedded device is manipulated consistent with the positional rule. In one embodiment, a user is alerted upon manipulating the power state of the embedded device.

A further aspect of an embodiment relates to a computerized method for utilizing location-based data to manipulate a power state of an embedded device. Initially, the method includes receiving location-based data from a global positioning system (GPS) transmitting device, where the location-based data relates to a global position of a mobile device. A set of positional rules is applied to the location-based data, thereby an appropriate power level of the embedded device within the mobile device is determined. Based on the determined appropriate power level, the power state of the embedded device is manipulated. In one embodiment, manipulating the power state of the embedded device includes alternating the power state of the embedded device between an active mode and a suspended mode.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
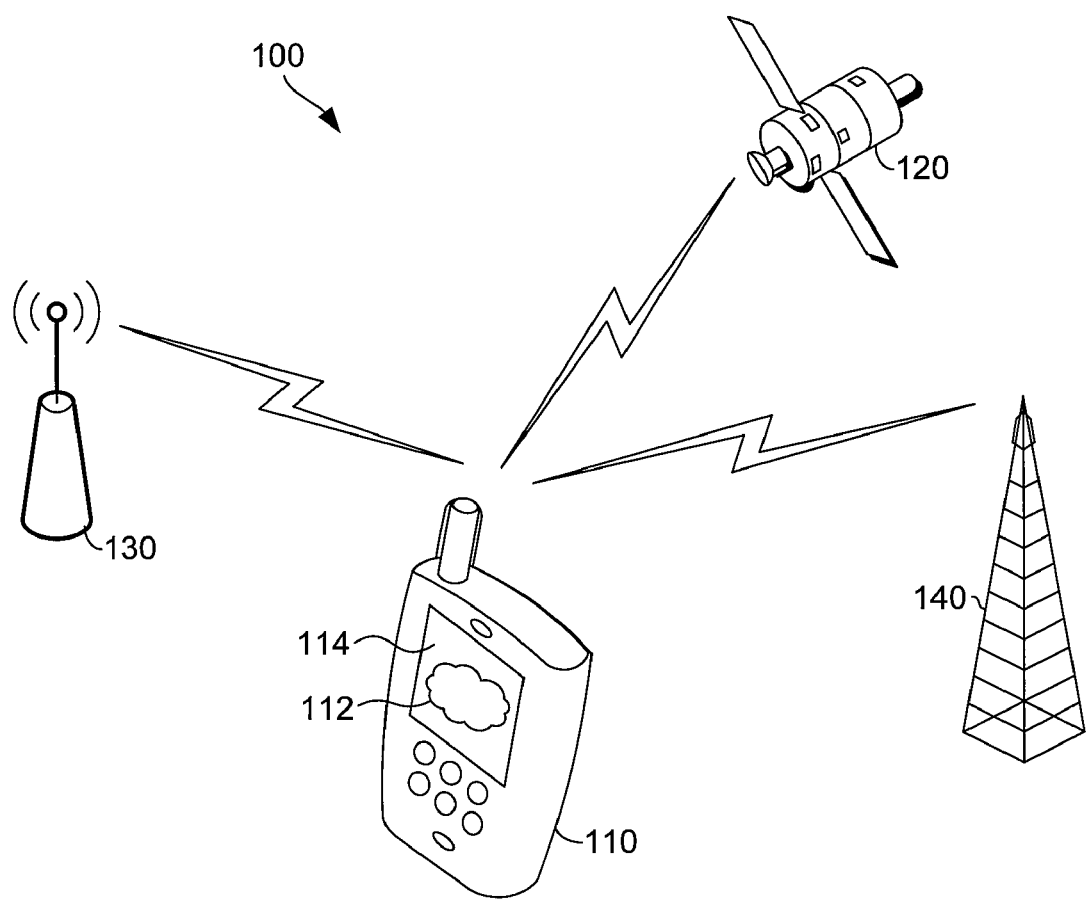
FIG. 1 is a schematic diagram of an exemplary system architecture suitable for use in implementing embodiments of the present invention.

Embodiments provide methods and a mobile device configured for utilizing location-based data to manipulate power states of one or more embedded devices therein. Initially, location-based data (e.g., global coordinates) from a positioning system (e.g., global positioning system satellite) is received. Generally, the location-based data relates to a global position of the mobile device. The location-based data may be applied to a set of positional rules, where the set of positional rules may reference one or more predefined positional coordinates associated with a power level. In particular, applying the set of positional rules includes comparing the position-based data against the one or more predefined positional coordinates. Typically, the positional rule is satisfied if the position-based data corresponds with at least one of the one or more predefined positional coordinates. Accordingly, the appropriate power level of one or more embedded devices may be determined. Further, if the determination indicates that a present power state of the embedded devices conflicts with the determined appropriate power level, the power states of the conflicting embedded devices are manipulated consistent with the positional rule. In one instance, a user of the mobile device is alerted upon manipulating the power state of an embedded device. As such, this configuration provides for a useful power-management scheme that preserves battery life by selecting embedded devices to suspend. Specifically, the power-management scheme suspends the selected embedded devices according to situations where they are not likely to be valuable to a user of the mobile device.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

GPS Global Positioning System
WANs Wide Area Networks

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Generally, in some aspects of the invention, methods and a mobile device are provided for utilizing location-based data to manipulate power states of one or more embedded devices. In particular, a determination whether to manipulate one or more embedded devices is based on applying a set of position rules to the location-based data. As used herein, the phrase "positional rules" is not meant to be limiting but can encompass any code, script, commands, or instructions that return an appropriate power level associated with an application or embedded device upon receiving input(s). Typically, these inputs are location-based data received from a positioning system. In another embodiment, inputs are related to a speed-of-travel of the mobile device as calculated from tracked movement over a time frame.

In some embodiments, the set of positional rules includes one or more predefined positional coordinates associated with a power level. Accordingly, in one instance, applying an input to the positional rules includes comparing the position-based data against the one or more predefined positional coordinates. If the position-based data corresponds with at least one of the one or more predefined positional coordinates, the positional rule is satisfied. And if the positional rule is satisfied, a power state of one or more embedded devices is manipulated consistent with the associated power level.

Referring to the drawings in general, and initially to FIG. 1 in particular, a schematic diagram of an exemplary operating environment 100 is shown. The illustrative operating environment 100 includes, in one embodiment, a mobile device 110, a GPS satellite 120 (which may actually be multiple satellites), a short-range wireless broadcasting device 130, and a telecommunications tower 140. Although the various components of FIG. 1 are shown with lines for the sake of clarity, in reality, delineating various components is not so clear, and metaphorically, the lines would more accurately be grey or fuzzy.

Further, although some components of FIG. 1 are depicted as single images, the depictions are exemplary in nature and in number and are not to be construed as limiting (e.g., although only one telecommunications tower 140 is shown, many more may be operably coupled to the mobile device 110). Further, the mobile device 110 may be coupled to one, several, or all of components 120, 130, and 140 (wired, wirelessly, or a combination thereof).

The mobile device 110 is configured to receive a transmission from any of components 120, 130, and 140. In one instance, the transmission may include location-based data. In addition, the mobile device is configured to convey a transmission to the short-range wireless broadcasting device 130 or the telecommunications tower 140 (e.g., utilizing an embedded radio, antenna, or other device). The mobile device 110 may be, or variously referred to as, a handheld device, mobile handset, consumer electronic device, a rugged industrial device (e.g., bar-code scanner), cell phone, personal digital assistant (PDA) unit, and the like.

Additionally, the mobile device 110 is configured to present a user interface 114 and even to receive inputs at an input component 112, in embodiments. The user interface 114 may be presented on any presentation component (not shown) that may be capable of presenting information to a user. In an exemplary embodiment, user interface 114 presents an alert (e.g., message, sound, blinking light, or any other visual indication) upon determining to manipulate power states of one or more embedded devices. The input component 112 may be a touch screen, a keypad, a joystick, trackball, touch-pad, input-receiving screen, or the like. In operation, the input component 112 may receive inputs from a user (e.g., alterations to positional rules) for processing, at least initially, at the mobile device 110.

Each of the GPS satellite 120, the short-range wireless broadcasting device 130, and the telecommunications tower 140 are configured to communicate with the mobile device 110. These communications, in the form of transmissions, may provide a variety of types of data, as more fully discussed below. Although, location-based data is discussed extensively herein, these other types of data (e.g., time-based data, broadcast-source identification data, information related to positional rules, radar signals, sonar, geographic coordinates, and the like) are contemplated by the invention.

Figure 2:
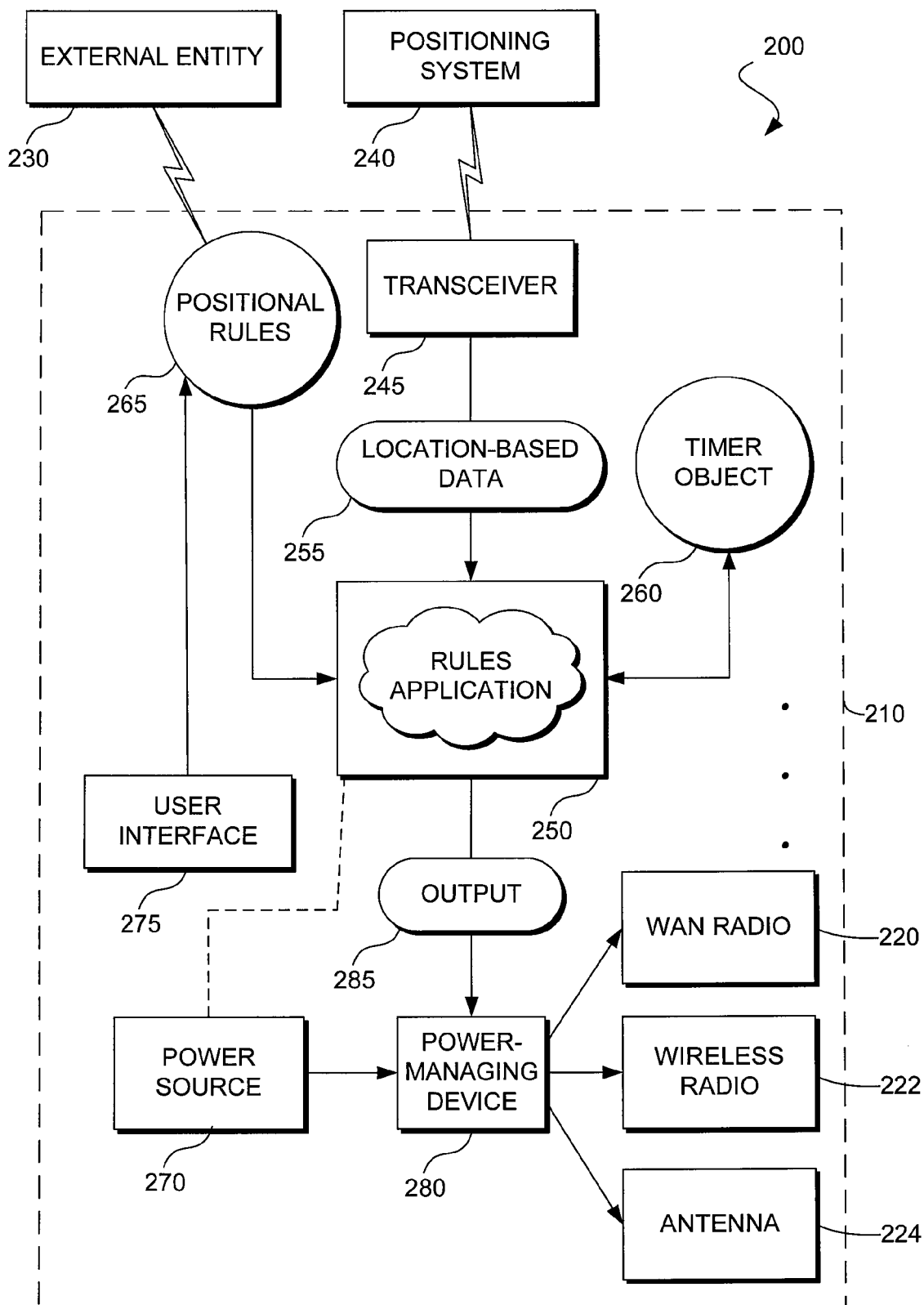
FIG. 2 is a schematic diagram showing a method for manipulating one or more embedded devices by applying a set of positional rules to location-based data, in accordance with an embodiment.

With reference to FIG. 2, a schematic diagram illustrating a method 200 for manipulating one or more embedded devices 220, 222, and 224 by applying a set of positional rules 265 to location-based data 255 is shown, in accordance with an embodiment. Initially, a positioning system 240 communicates with a transceiver 245 (e.g., GPS receiver) via a wireless transmission. The communication is processed by the transceiver 245 and the location-based data 255 is provided to a rules application 250. The rules application 250 is configured to execute a power-management scheme that dictates the power state of the embedded devices 220, 222, and 224 individually or in a coupled manner.

Specifically, in an exemplary embodiment, the rules application 250 applies the set of positional rules 265 to the location-based data 255 to determine whether one or more of the positional rules 265 are satisfied. In one instance, the set of positional rules 265 is provided by an external entity 230 (e.g., institution of employment of the user). These positional rules 265 may be provided or altered in accordance with a power-management policy maintained by the external entity 230. Factors that contribute to the power-management policy include safety of a user, assistance in navigation, security, intuitive uses of a mobile device 210, and the like. Providing the positional rules 265 to the mobile device 210 (e.g., mobile device 110 of FIG. 1) may be carried out by any known uploading/downloading process, such as concurrently updating many mobile devices of a common configuration. In another instance, positional rules 265 may be input or altered by the user at a user interface 275 (e.g., user interface 114 of FIG. 1).

In addition to positional rules 265, the rules application 250 may be configured to receive and process various other types of inputs. By way of example only, the rules application may receive timestamps from a timer object 260. This type of input may be useful when the transceiver 245 is providing location-based data 255 periodically over a time frame, thereby allowing for the mobile device 210 to track its geographic movement. Accordingly, a timer object 260 may be queried by the rules application 250 to retrieve timestamps corresponding with the periodically received location-based data 255. Operatively, a speed-of-travel of the mobile device 210 may be calculated based on the tracked movement of the mobile device 210 and the timestamps retrieved from the timer object 260. The speed-of-travel of the mobile device 210 can then be used to determine whether the positional rules 265 are satisfied, where these rules accept speed, as opposed to position, as an input. However, similar to the rules that accept position inputs, if the determination indicates that the positional rules 265 are satisfied, the power state of one or more of the embedded devices 220, 222, and 224 may be manipulated consistent with the positional rules 265.

Still another type of input that might be received by the rules application 250 is a status of a power source 270. Typically, the power source 270 supplies power to one or more of the embedded devices 220, 222, and 224. In one instance, the power source 270 may be monitored in a continuous or intervallic fashion by the rules application 250 to determine the status of the power source 270. In another instance, the power source 270 sends its status in response to a trigger (e.g., upon a power level dropping below a predetermined threshold). Accordingly, the rules application 250 may base its determination of an appropriate power level for one or more of the embedded devices 220, 222, and 224, at least in part, on the status of the power source 270.

Upon making a determination of an appropriate power level utilizing the rules application 250, an output 285 may be generated and provided to a power-managing device 280. Generally, the output 285 includes instructions on whether to manipulate the power state of one or more of the embedded devices 220, 222, and 224. In embodiments, the output 285 triggers the manipulation of the power states of one or more of the embedded devices 220, 222, and 224. In one exemplary configuration, the output 285 includes an identification of one or more of the embedded devices 220, 222, and 224 to manipulate. Also, in embodiments, the output 285 includes an indication of a power state associated with one or more of the embedded devices 220, 222, and 224.

The power-management device 280, incident to receiving the output 285, determines the current power states of the embedded devices 220, 222, and 224 and compares these to the recommended power states delivered in the output 285. If there is a conflict, the power management device 280 manipulates the current power state of one or more of the embedded devices 220, 222, and 224 to coincide with the recommended power states. In one instance, manipulation includes increasing or decreasing the flow of energy from the power source 270. In another instance, manipulation includes controlling an application running on one or more of the embedded devices 220, 222, and 224 to adjust the power required thereby. By way of example, controlling an application may include alternating the application between an active mode and a suspend mode, or even power off. Accordingly, one or more of the embedded devices 220, 222, and 224 may be automatically activated or deactivated when needed, thereby optimizing the utility of the mobile device 210 and reducing inefficient consumption of power.

It should be noted that the components within the mobile device 210 are exemplary in nature and should not be construed as limiting. In embodiments, the components may be stand-alone elements or may be integrated directly into the operating system of the mobile device 210. Any number of components may be employed to achieve the desired functionality within the scope of embodiments of the invention (e.g., more or less embedded devices of different functionality). Accordingly, the method 200 should not be interpreted as having any dependency or requirement related to any single component or combination of components illustrated therein.

Figure 3:
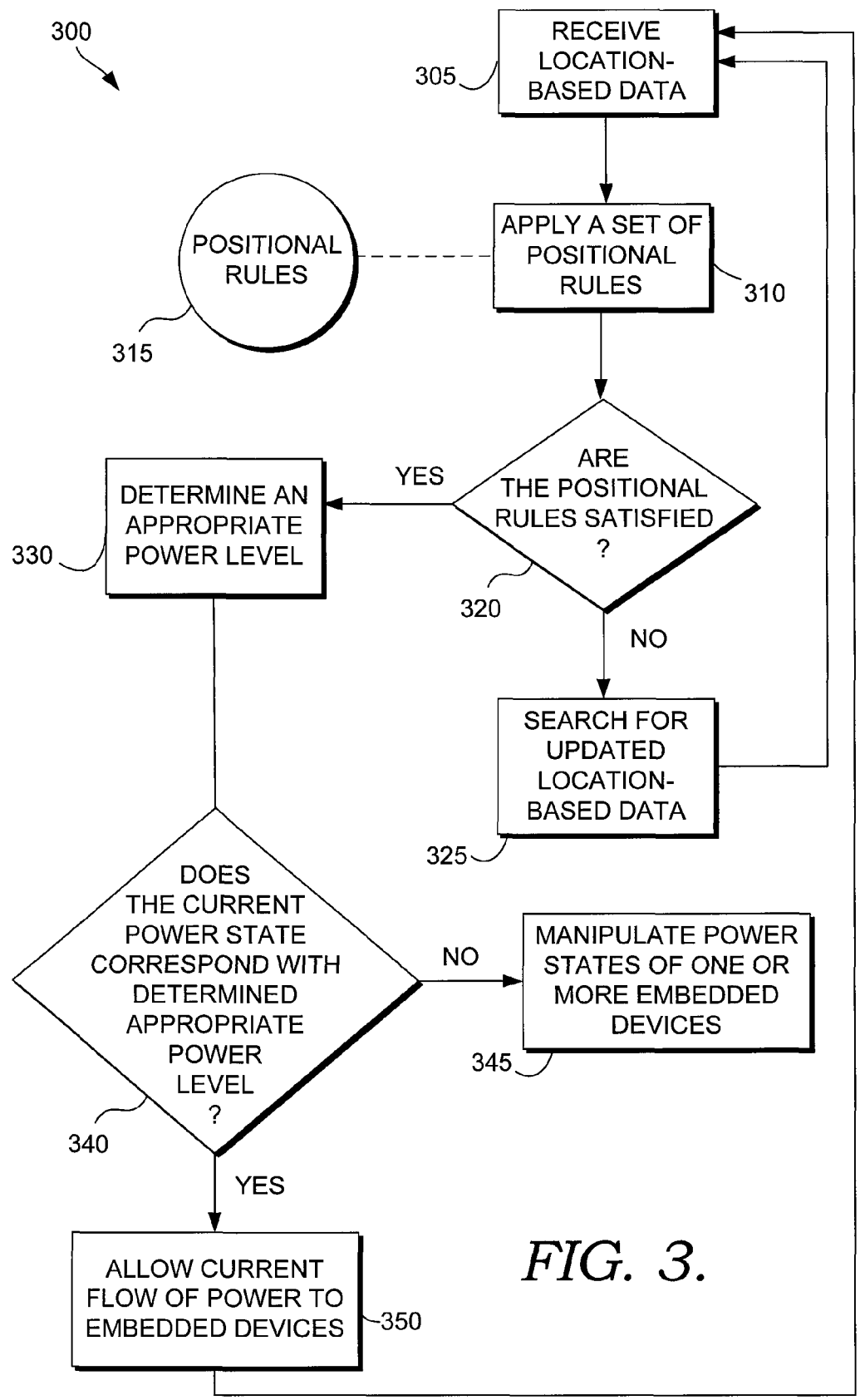
FIG. 3 is a flow diagram showing an overall method for utilizing location-based data to manipulate power states of embedded devices, in accordance with an embodiment.

Turning now to FIG. 3, a flow diagram that illustrates an overall method 300 for utilizing location-based data to manipulate power states of embedded devices is shown, in accordance with an embodiment. Initially, location-based data is received (e.g., utilizing transceiver 245 of FIG. 2), as indicated at block 305. As indicated at block 310, positional rules 315 are received and applied to the location-based data. The positional rules 315 may be provided from an internal or external source. A determination whether the positional rules are satisfied is made (e.g., at rules application 250 of FIG. 2), as indicated at block 320. If the positional rules 315 are not satisfied, a search for updated location-based data is commenced, as indicated at block 325, and the loop is repeated.

If the positional rules are satisfied (e.g., the position of the mobile device corresponds with one or more predefined positional coordinates), an appropriate power level is determined for one or more embedded devices. As indicated at block 340, a determination whether the current power state of one or more embedded devices corresponds with the determined appropriate power level is made. If the power state and determined appropriate power level correspond, the current flow of power to one or more embedded devices is allowed, as indicated at block 350. That is, the current power state of one or more embedded devices remains unaltered (e.g., a wireless area network (WAN) radio is presently turned on, and the determination indicates that the WAN radio should be powered on). At this point, the loop is repeated such that the mobile device continues to receive and interpret the location-based data, as indicated at block 305.

If the power state and determined appropriate power level conflict, the current flow of power to one or more embedded devices is altered, as indicated at block 345. That is, the current power state of one or more embedded device is adjusted (e.g., a WAN radio is presently turned on, and the determination indicates that the WAN radio should be powered off).

Figure 4:
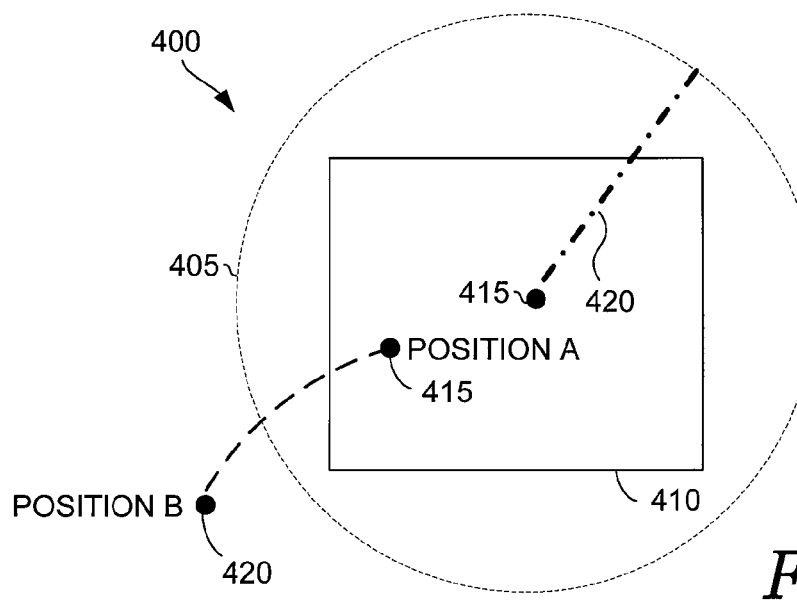
FIG. 4 is a diagrammatic view of a geographic region showing various positions of a mobile device in relation to a structure, in accordance with an embodiment.

Referring now to FIG. 4, a diagrammatic view of a geographic region 400 is illustrated showing various positions of a mobile device in relation to a structure 410, in accordance with embodiments of the invention. In Position A, as indicated by reference numeral 415, a mobile device is within predefined positional coordinates 405. In this example, the predefined positional coordinates 405 are based on a central global location 415 and a distance 420 extending radially therefrom. Essentially, the predefined positional coordinates 405 circumscribe the structure 410. Accordingly, location-based data received by the mobile device at Position A 415 (within structure 410) will satisfy a set of positional rules that includes the predefined positional coordinates 405. By way of contrast, a mobile device in Position B (outside structure 410), as indicated by reference numeral 420, will not satisfy a set of positional rules that includes the predefined positional coordinates 405.

In one exemplary situation, the structure 410 may be a warehouse to which a user of the mobile device is making deliveries. When the user is within the warehouse in Position A 415, the positional rules are satisfied, as discussed above. Accordingly, a phone-antenna embedded device may be adjusted to a suspended mode, as the user would naturally use a radio-style embedded device on the mobile device for communication within the warehouse (e.g., communication with dock personal to load/unload a delivery vehicle). Also, the phone-antenna embedded device may be adjusted to a suspended mode for purposes of security (e.g., where the predefined positional coordinates 405 are based on a position of a competitor's warehouse). Accordingly, the satisfied positional rules most likely indicate that the radio-style embedded device should be powered on. If the radio-style embedded device is powered off or in a suspended mode, the mobile device is triggered to manipulate the power state of the radio-style embedded device to an active mode.

Alternatively, the mobile device in Position B 420 is not in a location that satisfies the positional rules (e.g., removed from the predefined positional coordinates 405). Accordingly, the logic of the positional rules, when not satisfied, might trigger a yet an other rule. In this instance, the other rule may affect the function of the function of the mobile device by controlling components therein. By way of example only, the wireless radio embedded device may be automatically turned off to conserve power when not in use. In addition, the phone antenna embedded device is adjusted to an active mode, allowing the user to contact an employer, a client, etc., when traveling.

In another exemplary situation, the mobile device may not have a functioning transceiver. However, a transmission from a short-range wireless broadcasting unit (e.g., short-range wireless broadcasting unit 130 of FIG. 1) may be received by the mobile device and may have the same effect as receiving location-based data. For instance, upon receiving the transmission from a short-range wireless broadcasting unit within the structure 410 (e.g., at Position A), positional rules configured to interpret the transmission are invoked. If the positional rules determine that the short-range wireless broadcasting unit within the structure 410 is recognized, power states of one or more embedded devices may be manipulated in a manner similar to embodiments where location-based data is received and processed.

Figure 5:
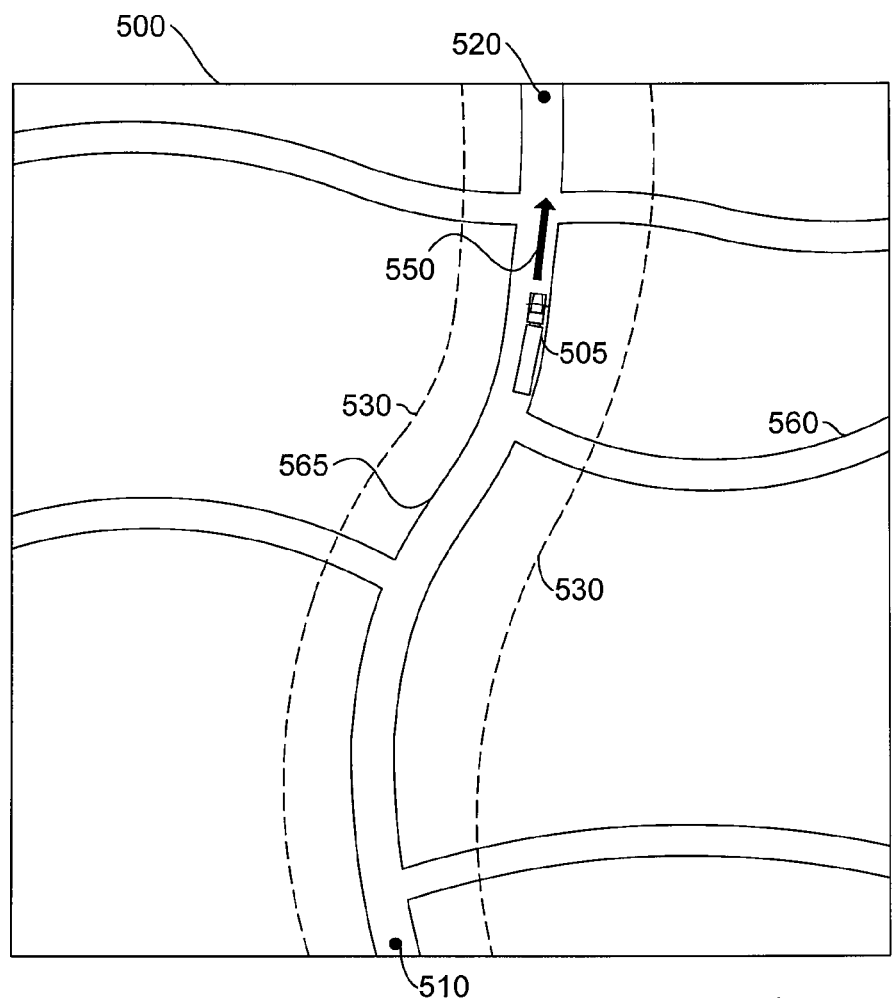
FIG. 5 is a diagrammatic view of a geographic region showing a mobile device in transit, in accordance with an embodiment.

FIG. 5 is a diagrammatic view of a geographic region 500 showing a mobile device 505 in transit, in accordance with an embodiment. In this exemplary situation, the predefined positional coordinates 530 utilized by the positional rules are based on a route 565 between starting point 510 and destination 520. As discussed above, when within the predefined positional coordinates 530 (e.g., on the route 565), the mobile device 505 satisfies the positional rules (e.g., the phone-antenna embedded device is in activated mode allowing a user to call an employer). When outside the predefined positional coordinates 530 (e.g., on the street 560), the mobile device 505 does not satisfy the positional rules (e.g., the phone-antenna embedded device returns to suspended mode preventing the user from making personal calls).

Additionally, speed-of-travel 550 of the mobile device 505 may be calculated, as discussed more fully above. The speed-of-travel may be applied to a set of positional rules that is configured to receive that type of input. In one instance, if the positional rules are satisfied because the speed-of-travel is high, the power states of the embedded devices are manipulated to the appropriate power levels (e.g., phone-antenna embedded device is adjusted to a suspended mode preventing a user from making a call when driving fast). In another instance, if the positional rules are not satisfied because the speed-of-travel is low, the power states of the embedded devices are adjusted to a default mode, or left unchanged (e.g., phone-antenna embedded device is adjusted to an active mode). In this instance, the power state of applications on the mobile device 505 may be adjusted as well (e.g., close a GPS mapping program when the mobile device 505 is stationary).

Although embodiments described above relate mainly to velocity-based positional rules, other calculations utilizing time and position may be executed. In addition, the resultant values from these other calculations may influence the control exercised by the positional rules. By way of example only, movement over time may be tracked against a clock function to find the acceleration of the mobile device (e.g., within a vehicle). This acceleration may be utilized to initiate the positional rules, switch to alternate positional rules, or switch off all control from the positional rules. In a particular instance, with consideration of this example in which acceleration is calculated, a mobile device may be deactivated from all communication when it is determined to be accelerating above a certain threshold inside of a warehouse, as a matter of safety.

It should be understood and appreciated that the various situations and examples above are provided for discussion purposes and are considered exemplary embodiments of the invention, not restrictions. For instance, some of the embodiments above discuss manipulating the components within a mobile device according to predefined positional rules that are satisfied by coordinates, such as GPS locations or other ways to track 2-dimensional position. However, embodiments of the present invention contemplate predefined positional rules that influence a mobile device based on a 3-dimensional position. By way of example only, a configuration of active and passive components of a mobile phone could vary, in accordance with the predetermined positional rules, from a location in a plane above a warehouse to a location within, or proximate to, the warehouse.

Further, the exemplary flow diagram illustrated in FIG. 3 is only one example of the suitable method for utilizing location-based data to manipulate power states of embedded devices and is not intended to suggest any limitation as to scope of use or functionality of the invention. For instance, a time factor may be incorporated into the method that affects when the positional rules can influence the mobile device. These time factors may relate to trigger times that activate or deactivate the control exercised by the positional rules. The trigger times may be set and/or adjusted internally or externally to the mobile device. Besides trigger times, the time factors may be any fixed or variable time(s) that act to apply or disengage the positional rules, such as a periodic time frame. By way of example only, the time factors may include trigger times set at the beginning and end of a workday (automatically updateable based on daylight savings time) that allow the mobile device to be used for work purposes within the workday trigger times, while disallowing certain functionality of the mobile device in the time frame after work and during weekends.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media having computer-useable instructions embodied thereon for performing a method of utilizing location-based data to manipulate power states of one or more embedded devices, the method comprising:
   receiving, at a computing device having a processor and memory, location-based data from a positioning system, the location-based data describing a geographic positioning of a mobile device;
   monitoring, at the computing device, a status of a power source that supplies power to the one or more embedded devices;
   applying a set of positional rules to the location-based data to determine an appropriate power level of the one or more embedded devices within the mobile device, wherein determining the appropriate power level is based at least in part on the status of the power source, and further wherein the set of positional rules references one or more predefined positional coordinates associated with a power level, and determining whether one or more rules in the set of positional rules was satisfied by the location-based data comprises:
      comparing the location-based data against the one or more predefined positional coordinates; and
      if the location-based data corresponds with the one or more predefined positional coordinates, indicating that the positional rule is satisfied;
   providing for manipulating the power states of the one or more embedded devices based on the determined appropriate power level; and
   at least temporarily storing the power states consistent with the manipulation at a mobile device.

2. The media of claim 1, further comprising generating an output upon determining the appropriate power level of the one or more embedded devices within the mobile device, wherein the output triggers the manipulation of the power states of the one or more embedded devices.

3. The media of claim 2, wherein the output comprises:
   an identification of the one or more embedded devices; and
   an indication of a power state associated with each of the one or more embedded devices.

4. The media of claim 1, wherein the positioning system is a global positioning system (GPS) satellite.

5. The media of claim 4, wherein the location-based data is received at a GPS transceiver on the mobile device.

6. The media of claim 1, wherein the one or more embedded devices comprise at least one of a wireless radio, a wide area network (WAN) radio, a global positioning system (GPS) antenna, or a telecommunications device.

7. A mobile device having one or more components thereon for performing a method for utilizing location-based data to manipulate power states, the method comprising:
   receiving location-based data from a positioning system, the location-based data describing a global position of the mobile device;
   applying a positional rule to the location-based data, wherein the positional rule maps the global position of the mobile device to one of the power states of an embedded device, and further wherein the positional rule references one or more predefined positional coordinates associated with a power level;
   receiving a status of a power supply that supplies power to the embedded device, wherein the status of the power supply is monitored;
   determining whether the positional rule is satisfied by the location-based data, wherein determining whether the positional rule was satisfied by the location-based data comprises:
      comparing the location-based data against the one or more predefined positional coordinates; and
      if the location-based data corresponds with the one or more predefined positional coordinates, indicating that the positional rule is satisfied; and
   when the determination indicates that the positional rule is satisfied, then manipulating the power state of the embedded device consistent with the positional rule, wherein manipulating the power state of the embedded device comprises determining an appropriate power level of the embedded device based at least in part on the status of the power supply.

8. The mobile device of claim 7, further comprising alerting a user of the mobile device upon manipulating the power state of the embedded device.

9. The mobile device of claim 7, wherein the location-based data is received periodically over a time frame to track a movement of the mobile device.

10. The mobile device of claim 9, wherein a timer object is queried to retrieve timestamps corresponding with the periodically received location-based data.

11. The mobile device of claim 10, further comprising:
   calculating a speed-of-travel of the mobile device based on the tracked movement of the mobile device and the timestamps;
   determining whether the positional rule is satisfied by the speed-of-travel of the mobile device; and
   if the determination indicates that the positional rule was satisfied, manipulating the power state of the embedded device consistent with the positional rule.

12. The mobile device of claim 7, further comprising:
receiving a transmission from a short-range wireless broadcasting device;
determining whether the short-range wireless broadcasting device is recognized by utilizing the positional rule; and
if the short-range wireless broadcasting device is recognized, manipulating the power state of the embedded device.

13. The mobile device of claim 12, wherein the embedded device is a wide area network (WAN) radio, wherein manipulating the power state of the embedded device comprises decreasing the power state of the WAN radio.

14. A computerized method for utilizing location-based data to manipulate a power state of an embedded device, the method comprising:
receiving, at a computing device having a processor and a memory, location-based data from a global positioning system (GPS) transmitting device, the location-based data relating to a global position of a mobile device;
receiving, at the computing device, a status of a power source that supplies power to the embedded device, wherein the status of the power source is monitored;
applying a set of positional rules to the location-based data, thereby determining an appropriate power level of the embedded device within the mobile device, wherein determining the appropriate power level is based at least in part on the status of the power source, and further wherein the set of positional rules references one or more predefined positional coordinates associated with a power level, and determining whether one or more rules in the set of positional rules was satisfied by the location-based data comprises:
comparing the location-based data against the one or more predefined positional coordinates; and
if the location-based data corresponds with the one or more predefined positional coordinates, indicating that the positional rule is satisfied; and
manipulating the power state of the embedded device based on the determined appropriate power level.

15. The method of claim 14, wherein manipulating the power state of the embedded device comprises increasing a flow of power from a power source to the embedded device.

16. The method of claim 14, wherein manipulating the power state of the embedded device comprises alternating the power state of the embedded device between an active mode and a suspended mode.

17. The method of claim 14, further comprising:
applying a set of positional rules to the location-based data, thereby determining whether to close an application running the device; and
providing for closing the application if the determination so indicates.

* * * * *